M. WALTY.
Chucks for Holding Pipe-Fittings.
No. 141,612. Patented August 5, 1873.
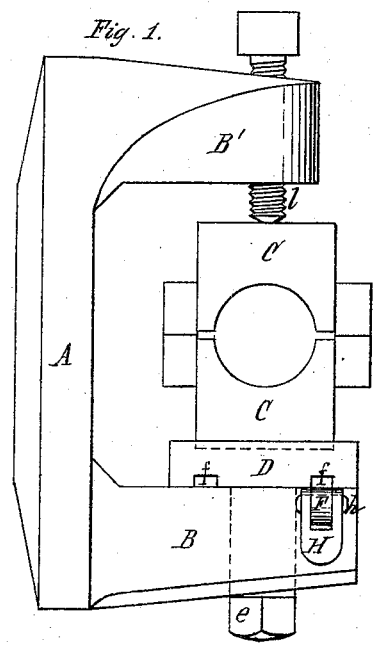
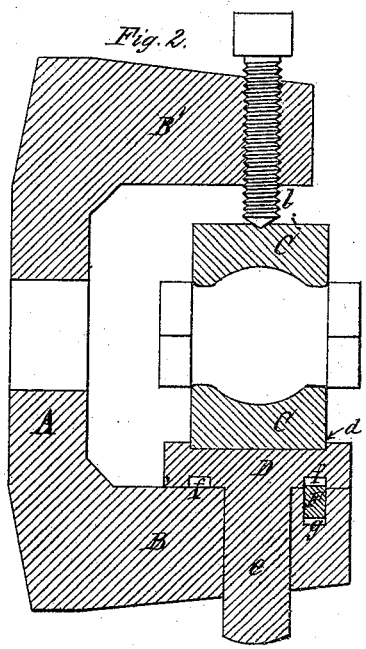
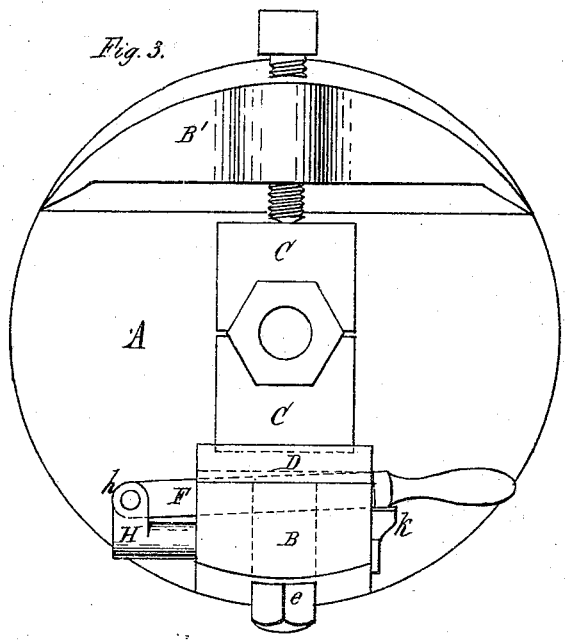
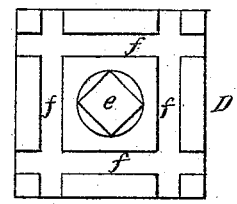
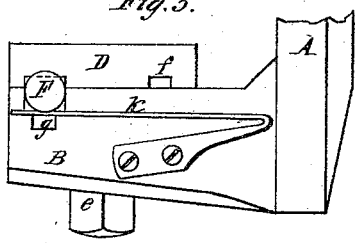
Witnesses: Edward Wilhelm, John J. Bonner
Mathias Walty, Inventor
by Jay Hyatt, Atty.

UNITED STATES PATENT OFFICE.

MATHIAS WALTY, OF BUFFALO, NEW YORK.

IMPROVEMENT IN CHUCKS FOR HOLDING PIPE-FITTINGS.

Specification forming part of Letters Patent No. 141,612, dated August 5, 1873; application filed May 14, 1873.

*To all whom it may concern:*

Be it known that I, MATHIAS WALTY, of the city of Buffalo, in the county of Erie and State of New York, have invented certain Improvements in Lathe-Chucks for Holding Cocks, Pipe-Fittings, &c., of which the following is a specification:

My invention relates to that class of chucks which are employed for turning articles having two or more faces or points to be operated upon without removing the article from the chuck; and it consists of an improved device for adjusting and holding the jaws or chucks proper, between which the article to be turned is clamped.

In the accompanying drawing, Figure 1 is a side elevation, Fig. 2 a sectional elevation, and Fig. 3 a front elevation, of my improved chuck. Fig. 4 is a plan view of the rotating chuck-bearing; and Fig. 5, a fragmentary side elevation, showing the spring which holds the locking-lever of the chuck-bearing.

Like letters of reference designate like parts in each of the figures.

A represents the disk or head mounted on the lathe-mandrel, and B B' two parallel arms or supports projecting from the face thereof. C C represent the two jaws or chucks proper, between which the article to be operated upon is clamped. D is the chuck bearing or holder, arranged on the inner side of the support B, and provided with a recess or socket, $d$, for the reception of one of the clamps or chucks C, and on its opposite side with a pivot, $e$, passing through the support B. $f$ are locking-grooves arranged in the chuck-holder D, adjacent to the support B, at right angles to each other, or in any other manner, according to the relative position of the faces or points of the article, which are to be successively presented to the dressing-tool. F is the locking-lever arranged between the contiguous surfaces of the chuck-holder D and support B in a recess, $g$, formed in the latter in such manner as to coincide with one of the locking-grooves $f$ when the article clamped between the chucks C C is in the proper position to be operated upon. The lever F has its fulcrum at $h$ in a bracket, H, secured to the support B, and extends through the latter at the opposite side, where it is provided with a suitable handle. $k$ represents a reacting-spring secured to the side of the support B, so as to bear under the free end of the lever F, thereby holding the latter in contact with the chuck-bearing D. $l$ is a set-screw working through the supporting-arm B' in line with the pivot $e$ of the chuck-holder, and bearing against the upper one of the jaws or chucks C.

The article to be turned being placed between the jaws or chucks C C, the latter are placed in the recess $d$ of the chuck-bearing D, whereby, tightening the set-screw $l$, the article is firmly clamped. The locking-lever F engaging in the adjacent locking-groove $f$ of the chuck-holder, the latter is securely held in its position while the face of the article which is presented to the dressing-tool is operated upon. By depressing the lever F so as to withdraw it from the locking-groove, the chuck-holder is released and readily turned on its pivot $e$, with the chucks C C and article clamped between them, by applying a suitable wrench to the projecting square end of the pivot $e$. As the chuck-holder is rotated the locking-grooves $f$ coincide successively with the locking-lever F, which is made to engage therein by the reaction of the spring $k$ as soon as it is released. In this manner the chucks C are readily adjusted and held in any of the positions indicated by the locking-grooves $f$, and the different faces of the article presented successively to the dressing-tool. After loosening the set-screw $l$ the chucks C C can be readily removed from the chuck-holder for the insertion of another article.

It is evident that different chucks adapted to receive articles of various shapes and sizes can be readily arranged in the chuck-holder D, whereby the operation of finishing the same is considerably simplified.

My improved lathe-chuck is very efficient and durable, and can be produced at comparatively small expense.

What I claim as my invention is—

1. The combination, with the supporting-arm B and spring-locking lever F k, of the recessed and pivoted chuck-bearing D and removable chucks C C, substantially as and for the purpose hereinbefore set forth.

2. The combination, with the supporting-arm B and pivoted chuck-bearing D, provided with locking-grooves f on its under side, of the spring-locking lever F k, arranged in a recess in the face of the arm B contiguous to the chuck-bearing, substantially as hereinbefore set forth.

M. WALTY.

Witnesses:
　JNO. J. BONNER,
　EDWARD WILHELM.